(12) United States Patent
Vystavěl et al.

(10) Patent No.: US 11,499,926 B2
(45) Date of Patent: Nov. 15, 2022

(54) METHOD FOR DIFFRACTION PATTERN ACQUISITION

(71) Applicant: FEI Company, Hillsboro, OR (US)

(72) Inventors: Tomáš Vystavěl, Brno (CZ); Zuzana Hlavenková, Brno (CZ)

(73) Assignee: FEI Company, Hillsboro, OR (US)

( * ) Notice: Subject to any disclaimer, the term of this patent is extended or adjusted under 35 U.S.C. 154(b) by 108 days.

(21) Appl. No.: 16/917,114

(22) Filed: Jun. 30, 2020

(65) Prior Publication Data

US 2021/0404978 A1   Dec. 30, 2021

(51) Int. Cl.
*G01N 23/207*   (2018.01)
*G01N 23/2251*   (2018.01)
*G01N 23/046*   (2018.01)

(52) U.S. Cl.
CPC ......... *G01N 23/207* (2013.01); *G01N 23/046* (2013.01); *G01N 23/2251* (2013.01); *G01N 2223/045* (2013.01); *G01N 2223/0565* (2013.01); *G01N 2223/40* (2013.01)

(58) Field of Classification Search
CPC .............. G01N 23/207; G01N 23/046; G01N 23/2251; G01N 2223/045; G01N 2223/0565; G01N 2223/40; G01N 23/20058
See application file for complete search history.

(56) References Cited

U.S. PATENT DOCUMENTS

| | | | | |
|---|---|---|---|---|
| 8,253,099 B2* | 8/2012 | Nicolopoulos | ......... | H01J 37/05 250/311 |
| 8,841,613 B2* | 9/2014 | Zewail | ................ | H01J 37/285 250/311 |
| 10,068,749 B2* | 9/2018 | Fuller | ..................... | G01N 1/32 |
| 10,935,506 B2* | 3/2021 | Buijsse | ................. | G01N 23/04 |
| 2011/0220796 A1* | 9/2011 | Nicolopoulos | ......... | H01J 37/28 250/311 |
| 2011/0284744 A1* | 11/2011 | Zewail | ................. | H01J 37/228 250/311 |

* cited by examiner

*Primary Examiner* — David A Vanore (57) ABSTRACT

Methods and systems for conducting tomographic imaging microscopy of a sample with a high energy charged particle beam include irradiating a first region of the sample in a first angular position with a high energy charged particle beam and detecting emissions resultant from the charged particle beam irradiating the first region. The sample is repositioned into a second angular position such that the second region to be different than the first region, and a second region of the sample is irradiated. Example repositioning may include one or more of a translation of the sample, a helical rotation of the sample, the sample being positioned in a non-eucentric position, or a combination thereof. Emissions resultant from irradiation of the second region are then detected, and a 3D model of a portion of the sample is generated based at least in part on the detected first emissions and detected second emissions.

18 Claims, 5 Drawing Sheets

METHOD FOR DIFFRACTION PATTERN ACQUISITION

BACKGROUND OF THE INVENTION

Tomographic imaging microscopy is based on acquisition of sample images at a plurality of angles of exposure. Each of these images is acquired based on emissions/scattering detected during irradiation of the sample by a charged particle beam while the sample is at a desired tilt/angle/ position. Examples of this process can be found in Dan Shi et al. The Collection of MicroED Data for Macromolecular Crystallography. *Nature Protocols*. Vol. 11, pages 895-904 (2016), which delineates standard prior art protocols for MicroED. Generally, better quality images are able to be acquired when the sample is irradiated with a higher energy the charged particle beam, as emissions/scattering increases with beam energy. However, increasing the charged particle beam's energy also leads to a higher rate of degradation of the sample. Because of this, when a higher energy charged particle beam is used in tomographic imaging microscopy the quality of each subsequent image decreases since the higher rate of degradation of the sample means that each time the sample is imaged at a new angle the region of the sample being imaged is more damaged. Because tomographic imaging microscopy requires many images of high quality, this sample degradation prevents scientists from using higher energy charged particle beams during tomography. Thus, it is desired to find a way to limit sample degradation during tomographic imaging microscopy to allow for higher energy beams to be used.

SUMMARY

Methods and systems for conducting tomographic imaging microscopy of a sample with a high energy charged particle beam are disclosed. An example method includes irradiating a first region of the sample in a first angular position with a high energy charged particle beam and detecting first emissions resultant from the charged particle beam irradiating the first region. The sample is then caused to be repositioned into a second angular position and a second region of the sample is irradiated with the high energy beam. The repositioning of the sample into the second angular position causes the second region to be different than the first region. Example repositioning may include one or more of a translation of the sample, a helical rotation of the sample, the sample being positioned in a non-eucentric position, or a combination thereof. Second emissions resultant from the charged particle beam irradiating the second region are then detected, and a 3D model of a portion of the sample is generated based at least in part on the detected first emissions and detected second emissions. In various embodiments of the present invention, the repositioning of the sample into the first position and the repositioning of the sample into the second position may be discrete movements, or they may each represent portions of a continuous movement of the sample.

Systems for conducting tomographic imaging microscopy of a sample with a high energy beam, comprise a charged particle beam source operable to irradiate the sample with a charged particle beam, a rotatable sample holder operable to rotate the sample about an axis perpendicular to the charged particle beam between a first angular position and a second angular position, and a detection system operable to detect emissions resultant from the charged particle beam irradiating the sample. Example systems according to the present disclosure may further include one or more processors coupled to a memory, the memory storing non-transitory computer readable instructions that, when executed on the one or more processors, cause the system to execute methods according the present disclosure.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicates similar or identical items.

Like reference numerals refer to corresponding parts throughout the several views of the drawings. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

DETAILED DESCRIPTION OF EMBODIMENTS

Methods and systems for conducting tomographic imaging microscopy of a sample with a high energy beam are disclosed herein. Thus, the methods and systems described in the present disclosure allow a faster throughput for tomographic imaging microscopy, increased resolution of tomographic images generated via microscopy, or both. Included in the disclosure are descriptions of embodiments of the methods and systems that allow for a new region of the sample to be irradiated for each iteration of tomographic image acquisition. In this way, the detrimental effects caused by the degradation of the sample via charged particle beam irradiations is reduced by this novel tomographic imaging process and systems, as new portions of the sample are irradiated for each imaging iteration.

In some embodiments of the present invention, as the sample is rotated for tomographic imaging a translation and/or rotation is applied between periods of irradiation so that the charged particle beam irradiates a different region of the sample for each imaging iteration. In another embodiment, the sample may be placed in a non-eucentric position in relation to the charged particle beam path such that as the sample is rotated the region of the sample that is irradiated by the charged particle beam changes. However, these are only illustrations of particular embodiments of the invention disclosed herein, and the methods and system may include other combinations of the repositioning actions described herein to allow for each iteration of irradiation with the charged particle beam to be incident on at least a partially new region of the sample.

Figure 1:
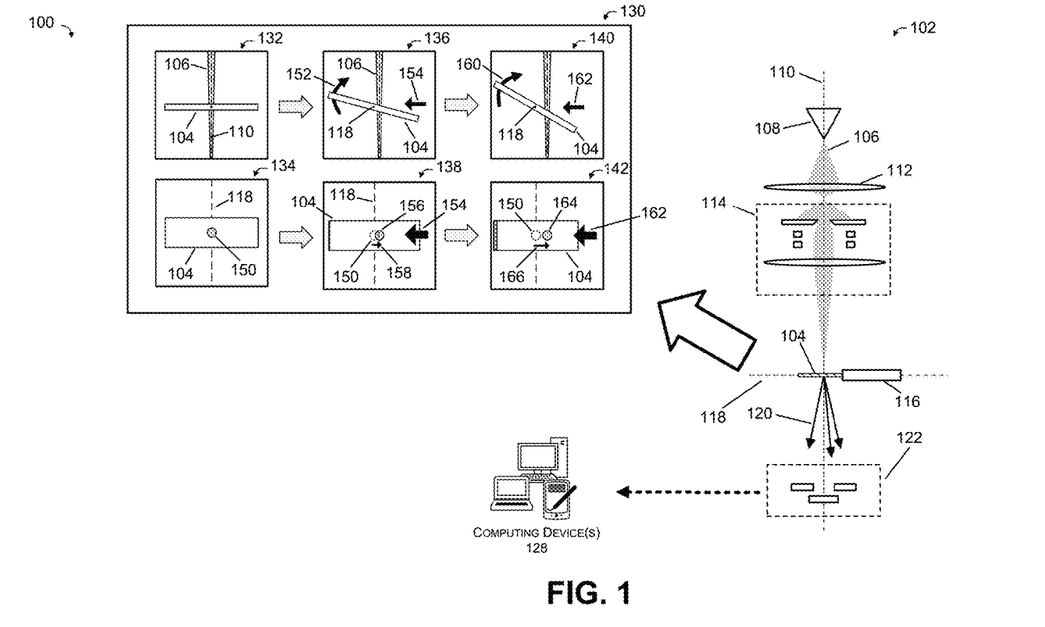
FIG. 1 illustrates example charged particle environment for conducting tomographic imaging microscopy of a sample with a high energy beam.

FIG. 1 is an illustration of an environment 100 for conducting tomographic imaging microscopy of a sample with a high energy beam. Specifically, FIG. 1 shows an example microscope system(s) 102 for generating tomographic images of a sample 104 with a high energy charged particle beam 106. It is noted that present disclosure is not limited to environments that include charged particle microscopes, and that in some embodiments the environments 100 may include a different type of system that is configured to generate tomographic images. For example, in an alternate environment the system 102 may correspond to a setup for conducting tomographic images by irradiating the sample 102 with x-rays and/or other electromagnetic waves.

The example microscope system(s) 102 includes a charged particle source 108 (e.g., a thermal electron source, Schottky-emission source, field emission source, ion source, etc.) that emits a charged particle beam 106 along an emission axis 110 and towards the sample 104. The emission axis 110 is a central axis that runs along the length of the example microscope system(s) 102 from the charged particle source 108 and through the sample 102.

An accelerator lens 112 accelerates/decelerates, focuses, and/or directs the charged particle beam 106 towards a focusing column 114 that focuses the charged particle beam 106 so that it is incident on at least a portion of the sample 102. In some embodiments, the focusing column 114 may include one or more of an aperture, deflectors, transfer lenses, scan coils, condenser lenses, objective lens, etc. that together focus particles from charged particle source 108 onto a small spot on the sample 104. Additionally, the focusing column 114 may correct and/or tune aberrations (e.g., geometric aberrations, chromatic aberrations) of the charged particle beam 106.

FIG. 1 shows the sample 104 as being coupled to on a sample holder 116 that is configured to rotate the sample about an axis 118 to a desired angle in response to activation of a motor or other mechanism. For example, the sample holder 116 or a component thereof may be configured to rotate around axis 118 so that the surface of the sample 104 rotates about the axis 118. In some embodiments, the sample may be able to rotate the sample within a range of angles, within a full rotation, or greater than a full rotation (e.g., continuous rotation of the sample). In this way, during tomographic imaging of the sample 104, the sample holder 116 causes the sample 102 to rotate through a series of angular positions about the axis 118, and the sample 104 is irradiated by the charged particle beam 106 and/or images of the sample 104 are obtained at different angular positions. In various embodiments, such a rotation of the sample may comprise discrete rotations between angular positions, a continuous rotation through multiple angular positions, or a combination thereof.

Sample holder 116 is further configured to reposition the sample 104 (e.g., translate, rotate, and/or tilt the sample 104 in relation to the example charged particle microscope system 102) between a first rotational position where the charged particle beam 106 is incident on a first region of the sample, and a second rotational position where the charged particle beam 106 is incident on a second region of the sample that is different from the first region. Specifically, the movement of the sample from the first rotational position to the second rotational position causes the sample 104 to be repositioned in relation to the charged particle beam 106 such that, without adjustment/deflection of the charged particle beam 106, a positional difference of the region of the sample 104 that is irradiated by the beam is caused. That is, the movement of the sample from the first rotational position into the second rotational position causes a relative movement of the point of irradiation of the charged particle beam 106 from the first region to the second region. In various embodiments, this movement may cause at least 25%, 33%, 40%, 50%, 51% of the second region of the sample is not within the first region of the sample. In some embodiments, this movement may be such that the second region is completely different from the first region.

Because the second region is different from the first region, the dose of the charged particle beam 106 that is used to irradiate each region when capturing tomography images can be increased compared what is currently possible according to current tomographic technology/procedures. For example, because many images are required to be captured in tomographic imaging (e.g., 40, 80, 120, or more images), because the irradiation by the charged particle beam 106 used to capture each image causes damage to the sample, and because this damage harms the structures that are operators are intending to image via the tomography, the beam does that current tomography procedures are able to use is greatly limited. However, while prior art procedures generally limit beam does for MicroED procedures to 0.01 $e^-/Å^2/s$, the systems and methods according to the present invention allow a beam dose that is up to 10 times greater. This improves the speed of acquisition of the tomographic images, the resolution of the acquired tomographic images, or both.

This process of repositioning the sample 104 (i.e., translate, rotate, and/or tilt the sample 104 in relation to the example charged particle microscope system 102) can then be iteratively repeated so that multiple different regions of the sample are irradiated by the charged particle beam 106. Each iterative repositioning of the sample 104 may be a discrete repositioning of the sample (i.e., a set translation, rotation, and/or tilting of the sample 104 is applied so that sample 104 becomes statically positioned in a new position), may be a portion of a continuous repositioning of the sample (i.e., a continuous translation, rotation, and/or tilting of the sample through multiple sample positions), or a combination thereof. For example, the sample holder 116 may be configured to continuously rotate the sample 104 about axis 118 and the sample 04 may be irradiated by the charged particle beam 106 at set time intervals, set angular positions, etc. In another example, the sample holder 116 may apply a continuous translation, rotation, and/or tilting of the sample from a starting position to an ending position, and the sample 04 may be irradiated by the charged particle beam 106 at set time intervals, set angular positions, etc.

In some embodiments, the movement of the sample 104 from the first rotational position to the second rotational position in includes the sample holder 116 applying a translation of the sample 104 in relation to the charged particle beam 106 before, after, or concurrently with the rotation of the sample about the axis 118. However, the inventions disclosed herein are not limited to embodiments where this repositioning includes such a translational movement. For example, in some embodiments the repositioning between the first rotational position and the second rotational position may also include a first rotational movement about axis 118 and a second rotational movement about an additional axis that is different from axis 118. In this example embodiment, the combination of the first and second rotational movements may cause the sample 104 to move in a helical motion that causes the region of the sample that is irradiated by the charged particle beam 106 to change without the beam itself being adjusted or changed. Additionally, in some embodiments of the present invention, the sample 104 is placed in a non-eucentric position (e.g., wherein the sample is positioned between 5 µm and 50 µm from a eucentric position) such that, when the sample is rotated about the axis 118, the region of the sample that is irradiated by the charged particle beam changes. That is, the sample 104 may be positioned within the charged particle microscope system 102 such that, when the sample 104 is rotated about the axis 118 the region of the sample that is irradiated by the charged particle beam 106 to change without the beam itself being adjusted or changed.

A person having skill in the art would understand that these described embodiments are only examples, and that other combinations of these embodiments are also within the scope of the current invention. Moreover, while the repositioning described above only includes the movement between the first rotational position and the second rotational position, during tomographic imaging this repositioning is repeated iteratively at a plurality of rotational positions.

FIG. 1 further illustrates emissions 120 resultant from the charged particle beam 106 being incident on the sample 104. Emissions 120 may include portions of the charged particle beam 106 that pass through the sample, emitted charged particles, secondary electrons, x-rays, or a combination thereof. At least a portion of these emissions 120 are received by a detector system 122 to produce corresponding images. Thus, for each rotational position that the sample 104 is irradiated in, the detector system 122 detects emissions for reconstructing a corresponding image of at least a portion of the sample 104. In some embodiments, at least one detector of the detector system 122 is coupled to detect radiation produced in response to charged particle beam exposures of the sample and produce corresponding images. For dispersive X-ray like applications, at least one detector of the detector system 122 is an X-ray detector. For other applications, at least one detector of the detector system 122 is a charged particle detector. In some embodiments, the images are grayscale images that show contrasts indicative of the shape and/or the materials of the sample.

These images can be subsequently processed by one or more computing devices 128 to generate a reconstruction of at least a portion of sample 104 based on the images obtained via the detector system 122. For example, the computing device(s) 128 may be configured to produce a tomographic reconstruction (e.g., a 3D model) corresponding to the sample based on the tomographic images obtained via the detector system 122. The computing device(s) 128 are shown as being communicatively coupled to the example charged particle microscope system 102. In some embodiments, the reconstruction of the at least a portion of the sample by the computing device 128 is further generated based on a positional difference between the first region and the second region. The positional difference corresponds to the geometric relationship between the first region of the sample and the second region of the sample.

According to some examples, the computing device(s) 128 may be further executable to estimate this positional difference between the first region and the second region. For example, the computing devices may determine a vector difference between the first region of the sample and the second region of the sample. The estimation of the positional information may be performed based in part of any combination of accessing a data structure that stores correlations between a plurality of rotational positions of and corresponding positional relationships, a correlation between the images obtained via the detector system 122, calculating the translation of the sample that occurred during the repositioning from the first rotational position to the second rotational position, and at least one measurement from one or more of an optical sensor, an optical microscope, a camera, sensor components of the sample holder, and a driver of the sample holder. For example, the computing devices 128 may determine the positional difference by correlating/mapping the first image and the second image, and measuring the positional relationship between the first region and the second region based on the correlated image.

Alternatively, or in addition, the computing devices 128 may generate the reconstruction of the portion of the sample comprises determining that the first image and the second image each depict a same structure within the sample 104. For example, sample 104 may include one or both of crystal lattice and a protein suspended in the sample. This may correspond to the first image depicting a first portion of such a structure, while the second image depicts a second portion of the structure. Where the sample comprises a repeated structure, the computing devices 128 may combine the information in the first image with the information of the second image to generate a reconstruction of at least a portion of the repeated structure. For example, the detected first emissions resultant from the charged particle beam irradiating the first region and the detected second emissions resultant from the charged particle beam irradiating the second region may each describe different portions of a same crystalline structure of the crystal, and the computing devices 128 generate a 3D model of the crystalline structure based on the tomographic images resultant therefrom.

Those skilled in the art will appreciate that the computing devices 128 depicted in FIG. 1 are merely illustrative and are not intended to limit the scope of the present disclosure. The computing system and devices may include any combination of hardware or software that can perform the indicated functions, including computers, network devices, internet appliances, PDAs, wireless phones, controllers, oscilloscopes, amplifiers, etc. The computing devices 128 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

It is also noted that the computing device(s) 128 may be a component of the example charged particle microscope system(s) 102, may be a separate device from the example charged particle microscope system(s) 102 which is in communication with the example charged particle microscope system(s) 102 via a network communication interface, or a combination thereof. For example, an example charged particle microscope system(s) 102 may include a first computing device 128 that is a component portion of the example charged particle microscope system(s) 102, and which acts as a controller that drives the operation of the example charged particle microscope system(s) 102 (e.g., adjust the position of the sample 104 by operating a mechanism to move the sample holder 116, etc.). In such an embodiment the example charged particle microscope system(s) 102 may also include a second computing device 128 that is desktop computer separate from the example charged particle microscope system(s) 102, and which is executable to process data received from the detector system 122 to generate tomographic images of the sample 104, generate a 3D model of at least a portion of the sample 104, and/or perform other types of analysis. The computing devices 128 may further be configured to receive user selections via a keyboard, mouse, touchpad, touchscreen, etc.

For ease of understanding, FIG. 1 depicts a visual flow diagram 130 that includes a plurality of images that together depict a sample process for repositioning a sample 104 between a first, second, and third rotational position according to this embodiment of the current invention.

For example, image 132 shows a side view image of a sample 104 being held by a sample holder in a first rotational position. In image 132, the sample 104 is being irradiated with a charged particle beam 106 traveling along an emission axis 110. Similarly, image 134 shows a top down view the sample 104 being held in the first rotational position, and being irradiated with a charged particle beam 106. Image 134 further shows the first region 150 of the sample 104 that is irradiated by the charged particle beam 106.

Images 136 and 138 depict the sample 104 being held in the second rotational position from a side view, and a top down view, respectively. Image 136 also shows a first rotational movement 152 of sample 104 about axis 118 which changes the tilt of the sample in relation to the charged particle beam 106. Additionally, images 136 and 138 each show a first translational movement 154 of the sample 104 in relation to the charged particle beam 106. Image 138 shows how the first rotational movement 152 and the first translational movement 154 cause the second region 156 of the sample 104 to be irradiated by the charged particle beam 106. Image 138 also shows the positional difference 158 between the first region 150 that is irradiated when the sample 104 is in the first rotational position and the second region 156 that is irradiated when the sample 104 is in the second rotational position.

It is noted that the repositioning of the sample 104 from the first rotational position to the second rotational position does not require nor is it limited to including the first rotational movement 152 and the first translational movement. Rather, this is just an example embodiment of the inventive process, and a person having skill in the art would understand that other methods of repositioning the sample 104 from the first rotational position to the second rotational position (such as those described in other portions of the document) are within the scope of the present invention.

Images 140 and 142 depict the sample 104 being held in the third rotational position from a side view, and a top down view, respectively. Image 140 also shows a second rotational movement 160 of sample 104 about axis 118 which changes the tilt of the sample in relation to the charged particle beam 106. While the visual flow diagram 130 depicts the first rotational movement 152 and the second rotational movement 160 as being discrete movements, in other embodiments the first rotational movement 152 and the second rotational movement 160 may correspond to portions of a continuous movement between a starting position to an ending position. Additionally, images 140 and 142 each show a second translational movement 162 of the sample 104 in relation to the charged particle beam 106. While the visual flow diagram 130 depicts the first translational movement 154 and the second translational movement 162 as being discrete movements, in other embodiments the first translational movement 154 and the second translational movement 162 may correspond to portions of a continuous movement between a starting position to an ending position. Image 142 shows how the second rotational movement 160 and the second translational movement 162 cause a third region 164 of the sample 104 to be irradiated by the charged particle beam 106. Image 142 also shows the positional difference 166 between the first region 150 that is irradiated when the sample 104 is in the first rotational position and the third region 164 that is irradiated when the sample 104 is in the third rotational position. As can be seen in the visual flow diagram 130, as the sample 104 is repositioned between the first rotational position to the second rotational position (and to the third rotational position), the region of the sample 104 that is irradiated by the charged particle beam 106 changes.

Since during tomographic microscopy, an image of the sample is obtained at each rotational position by irradiating the sample with the beam, this means that for each image the region of the sample that is irradiated includes surface that has not been previously irradiated/imaged. This means that for each rotational position, the corresponding image includes surface area that has not been damaged by previous irradiation. Additionally, because a different region is imaged at each rotational position, a higher energy beam can be used during imaging since at least some of the resultant sample damage caused by the beam will not be within the region of the sample that is imaged at other rotational positions of the sample.

Figure 2:
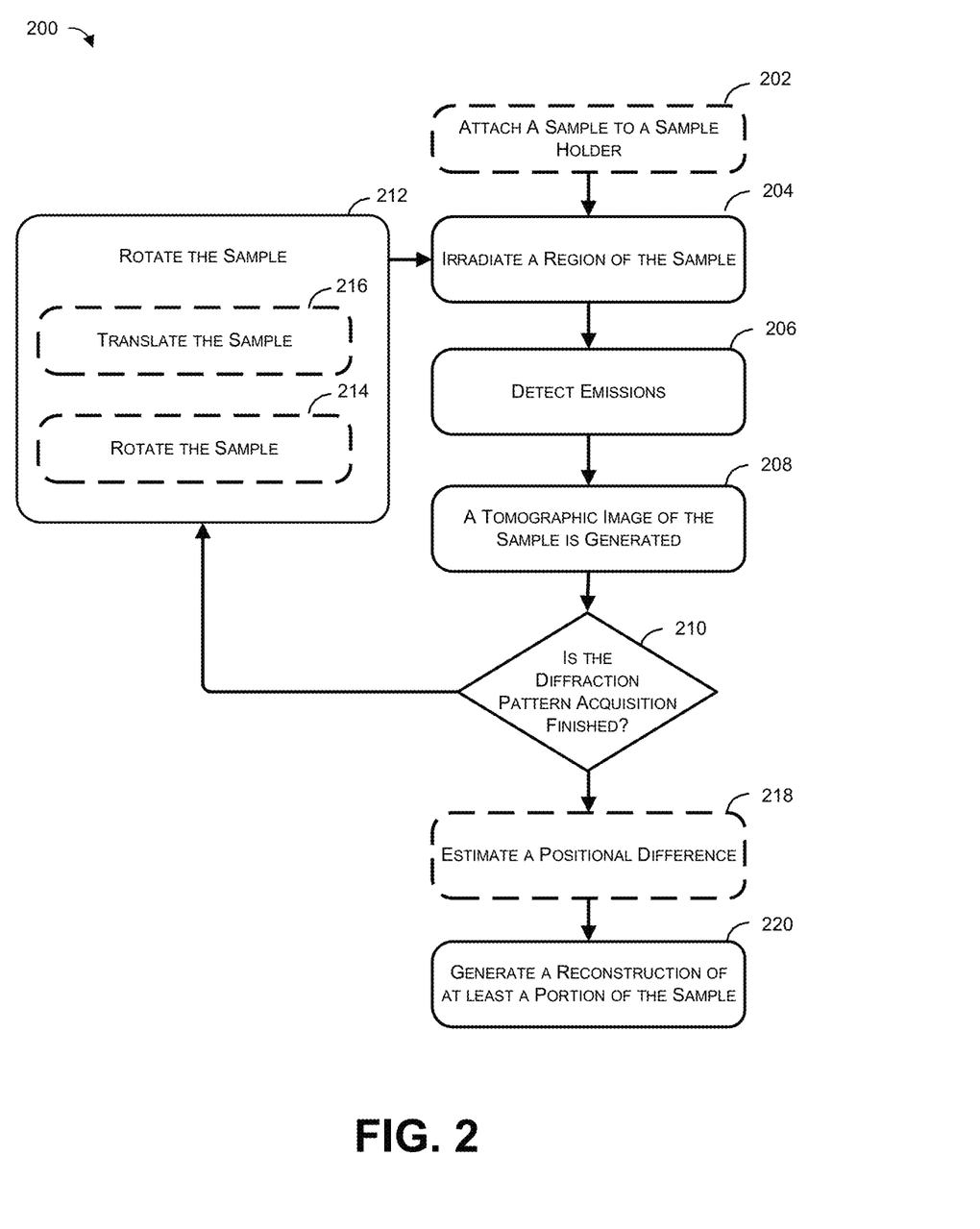
FIG. 2 depicts a sample process for conducting tomographic imaging microscopy of a sample with a high energy beam.

FIG. 2 is a flow diagram of illustrative processes depicted as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Specifically, FIG. 2 is a flow diagram of an illustrative process 200 for conducting tomographic imaging microscopy of a sample with a high energy beam. The process 200 may be implemented in environment 100 and/or by one or more computing device(s) 128, and/or in other environments and computing devices.

At 202, a sample is attached to a sample holder. In various embodiments the sample may correspond to but is not limited to being one of a lamella, a semiconductor, a single crystal, a needle shaped sample, (e.g., lysozyme) and a biological sample. For example, the sample may include a crystalline structure with a biological structure (e.g., a protein structure) suspended therein.

At 204, a region of the sample is irradiated. In some embodiments the region of the sample may be irradiated by a charged particle beam, such as an ion beam or an electron beam. Alternatively, the sample may be irradiated by X-rays. Irradiating the sample in this way inherently causes damage to the surface of the region of the sample being irradiated.

At 206, emissions resultant from the region of the sample being irradiated are detected. Example emissions may include portions of a charged particle beam that pass through the sample, emitted charged particles, secondary electrons, x-rays, or a combination thereof. The higher the energy of the beam irradiating the sample, the greater the amount of emissions that are able to be detected. At 208, a tomographic image of the sample at the corresponding rotational position is generated based on the detected emissions.

At 210, it is determined whether the tomographic images at additional rotational positions are to be acquired. During tomographic microscope imaging, a plurality of images of the sample are acquired at different rotational positions/tilt angles of the specimen. In various embodiments, a certain number of images may be taken, images at a number of preset rotational positions/tilt angles of the specimen. If it is determined at step 210 that additional tomographic images are to be acquired, the process continues at step 212 where the sample is rotated about an axis.

At 212, the sample is rotated to a new rotational position. For example, the sample may be attached to a sample holder that is configured to reposition the sample (e.g., translate, rotate, and/or tilt the sample in relation to a microscope system) between a first rotational position where a first region of the sample is irradiated during step 204, and a second rotational position where a second region of the sample that is different from the first region is irradiated during step 204. Specifically, the movement of the sample from the first rotational position to the second rotational position causes the sample to be repositioned in relation to the irradiating beam such that, without adjustment/deflection of the irradiating beam, a positional difference of the region of the sample that is irradiated by the beam is caused. That is, the movement of the sample from the first rotational position into the second rotational position causes a relative movement of the point of irradiation of the irradiating beam from the first region to the second region. This rotation to a new rotational position may be a discrete movement such that the sample is static in the new rotational position. Alternatively, or in addition, the rotation to a new rotational position may be a portion of a continuous movement between a starting position to an ending position (of which the new rotational position is between the starting and ending position).

In various embodiments, this movement may cause at least 25%, 33%, 40%, 50%, 51% of the second region of the sample is not within the first region of the sample. In some embodiments, this movement may be such that the second region is completely different from the first region. In an example embodiment, the sample is placed in a non-eucentric position (e.g., wherein the sample is positioned between 5 μm and 10 μm from a eucentric position) such that, when the sample is rotated about an axis, the region of the sample that is irradiated by the charged particle beam changes.

Step 212 is further illustrated in FIG. 2 as optionally including steps 214 and 216. Optional step 214 illustrates that the rotation of the sample described with regard to step 212 may also include an optional additional rotation of the sample about a different axis of rotation. That is, in some embodiments, the sample may also be rotated about this different axis before, after, or concurrently with the rotation of the sample described in step 212. In this such example embodiments, the combination of the first and second rotational movements may cause the sample to move in a helical motion. This optional rotation may be a discrete movement such that the sample is static in the new rotational position. Alternatively, or in addition, the optional rotation may be a portion of a continuous movement between a starting position to an ending position.

Similarly, optional step 216 illustrates that the rotation of the sample described with regard to step 212 may also optionally include a translation of the sample in relation to the beam irradiating the sample. In some embodiments, the movement of the sample from the first rotational position to the second rotational position in includes the sample holder applying a translation of the sample in relation to the charged particle beam before, after, or concurrently with the rotation of the sample about the axis performed in any of steps 212 or 214. Such a translation may at least partially cause the second region of the sample that irradiated during step 204 to be different from the first region that is irradiated during step 204 when the sample was in the first rotational position. The process then continues at step 204, and the sample is irradiated while in the new rotational position. In this new rotational position, at least a portion of the region that is irradiated has not previously been irradiated/imaged. This optional translation may be a discrete movement such that the sample is static in the new rotational position. Alternatively, or in addition, the optional translation to a new rotational position may be a portion of a continuous movement between a starting position to an ending position.

If the answer at 210 is no, the process continues to step 218, and a positional difference between the particular regions of the sample irradiated during the acquisition of at least two different tomographic images. The positional difference corresponds to the geometric relationship between the first region of the sample and the second region of the sample. For example, where a first region of the sample is irradiated to obtain a first tomographic image and a second region of the sample is irradiated to obtain a second tomographic image, then a positional difference (such as a vector difference) between the first region and the second region can be optionally obtained. The estimation of this positional information may be performed based in part of any combination of accessing a data structure that stores correlations between a plurality of rotational positions of and corresponding positional relationships, a correlation between the tomographic images obtained, calculating the translation of the sample that occurred during the repositioning from the first rotational position to the second rotational position, and at least one measurement from one or more of an optical sensor, an optical microscope, a camera, sensor components of the sample holder, and a driver of the sample holder.

At 218 a reconstruction of at least a portion of the sample is generated based on the tomographic images. For example, a tomographic reconstruction such as a 3D model corresponding to the sample may be generated based on the tomographic images obtained. In some embodiments, the reconstruction of the at least a portion of the sample is further generated based on the positional differences between regions of the sample irradiated in individual images.

Figure 3:
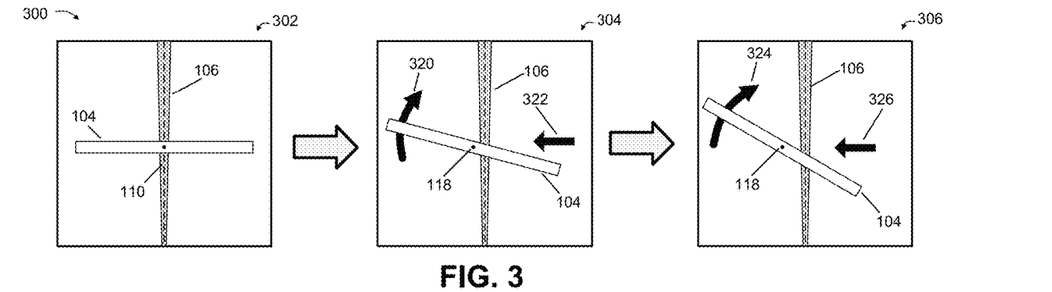
FIGS. 3, 5, and 7 show sets of side view diagrams that illustrate example processes for repositioning a sample to conduct tomographic imaging microscopy of a sample with a high energy beam.
Figure 4:
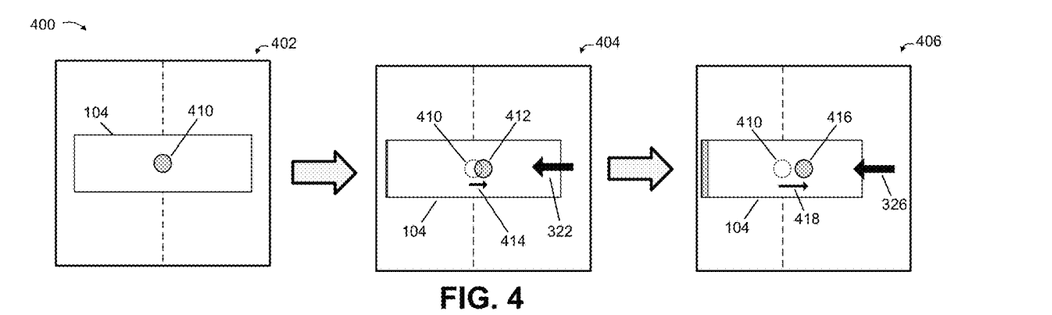
FIGS. 4, 6, and 8 show sets of side view diagrams that illustrate example processes for repositioning a sample to conduct tomographic imaging microscopy of a sample with a high energy beam.

FIGS. 3 and 4 are diagrams that illustrate a side view 300 and top down view 400 of a sample process for conducting tomographic imaging microscopy of a sample with a high energy beam. Specifically, FIG. 3 is a collection of side view images that illustrate a process for modifying the region irradiated during tomography by translating the sample between irradiation. Image 302 shows a side view image of a sample 104 being held by a sample holder in a first rotational position. In image 302, the sample 104 is being irradiated with a charged particle beam 106 traveling along an emission axis 110. Image 304 depicts the sample 104 being held in the second rotational position from a side view. Image 304 also shows a first rotational movement 320 of sample 104 about axis 118 which changes the tilt of the sample in relation to the charged particle beam 106. Image 304 also show a first translational movement 322 of the sample 104 in relation to the charged particle beam 106. Image 306 depicts the sample 104 being held in the third rotational position from a side view. Image 306 also shows a second rotational movement 324 of sample 104 about axis 118 which changes the tilt of the sample in relation to the charged particle beam 106. Additionally, image 306 shows a second translational movement 236 of the sample 104 in relation to the charged particle beam 106.

FIG. 4 is a collection of top down images that illustrate a process for modifying the region irradiated during tomography by translating the sample between irradiation. Image 402 shows a top down view the sample 104 being held in the first rotational position, and being irradiated with a charged particle beam 106. Image 402 further shows the first region 410 of the sample 104 that is irradiated by the charged particle beam 106. Image 404 shows the sample 104 being held in the second rotational position. Image 404 also shows a first translational movement 322 of the sample 104 in relation to the charged particle beam 106. Image 404 shows how the first rotational movement 320 and the first translational movement 322 cause the second region 412 of the sample 104 to be irradiated by the charged particle beam 106. Image 404 also shows the positional difference 414 between the first region 410 that is irradiated when the sample 104 is in the first rotational position and the second region 412 that is irradiated when the sample 104 is in the second rotational position.

Image 406 depicts the sample 104 being held in the third rotational position. Image 406 shows a second translational movement 326 of the sample 104 in relation to the charged particle beam 106. Image 406 shows how the second rotational movement 324 and the second translational movement 326 cause a third region 416 of the sample 104 to be irradiated by the charged particle beam 106. Image 406 also shows the positional difference 418 between the first region 410 that is irradiated when the sample 104 is in the first rotational position and the third region 416 that is irradiated when the sample 104 is in the third rotational position. While FIGS. 3 and 4 depict the first rotational movement 320, the second rotational movement 324, the first translational movement 322, and the second translational movement 326 as being discrete movements. However, one or more of these movements may correspond to a component portion of a continuous movement between a starting position to an ending position.

Figure 5:
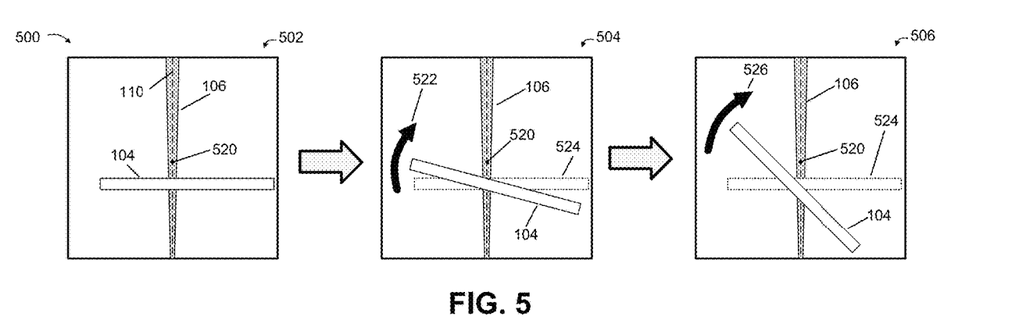
Figure 6:
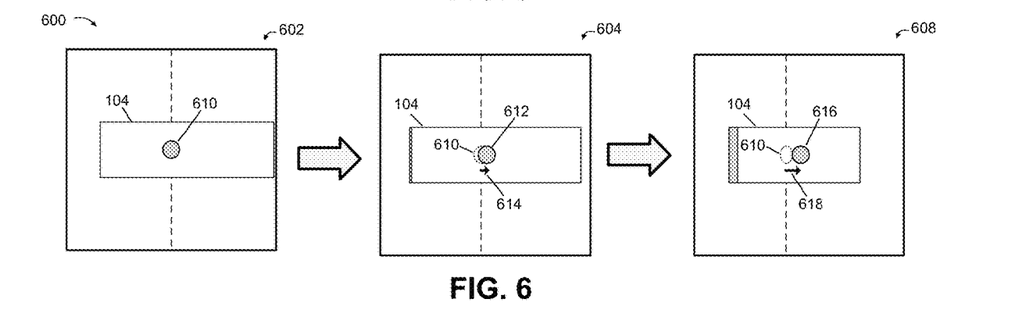

FIGS. 5 and 6 are diagrams that illustrate a side view 500 and top down view 600 of a second sample process for conducting tomographic imaging microscopy of a sample with a high energy beam. FIG. 5 is a collection of side view images that illustrate a process for modifying the region irradiated during tomography by rotating the sample in a non-eucentric position. Image 502 shows a side view image of a sample 104 being held by a sample holder in a first rotational position, where the sample 104 is not centered at its rotational axis 520. In image 502, the sample 104 is being irradiated with a charged particle beam 106 traveling along an emission axis 110. Image 504 depicts the sample 104 being held in the second rotational position from a side view. Image 504 also shows a first rotational movement 522 of sample 104 about axis 118 which changes the tilt of the sample in relation to the charged particle beam 106. Image 504 also show an outline of the sample in the first rotational position 524. Image 506 depicts the sample 104 being held in the third rotational position from a side view. Image 506 also shows a second rotational movement 526 of sample 104 about axis 520, as well as an outline of the sample in the first rotational position 524.

FIG. 6 is a collection of top down images that illustrate a process for modifying the region irradiated during tomography by rotating the sample in a non-eucentric position. Image 602 shows a top down view the sample 104 being held in the first rotational position, and being irradiated with a charged particle beam 106. Image 602 further shows the first region 610 of the sample 104 that is irradiated by the charged particle beam 106. Image 604 shows the sample 104 being held in the second rotational position after it has been rotated. Image 404 shows how the first rotational movement 522 causes the second region 612 of the sample 104 to be irradiated by the charged particle beam 106. Image 604 also shows the positional difference 614 between the first region 610 that is irradiated when the sample 104 is in the first rotational position and the second region 612 that is irradiated when the sample 104 is in the second rotational position.

Image 606 depicts the sample 104 being held in the third rotational position. Image 606 shows how the second rotational movement 522 causes a third region 616 of the sample 104 to be irradiated by the charged particle beam 106. Image 606 also shows the positional difference 618 between the first region 610 that is irradiated when the sample 104 is in the first rotational position and the third region 616 that is irradiated when the sample 104 is in the third rotational position. While FIGS. 5 and 6 depict the first rotational movement 522 and the second rotational movement 526 as being discrete movements. However, one or both of these movements may correspond to a component portion of a continuous movement between a starting position to an ending position.

Figure 7:
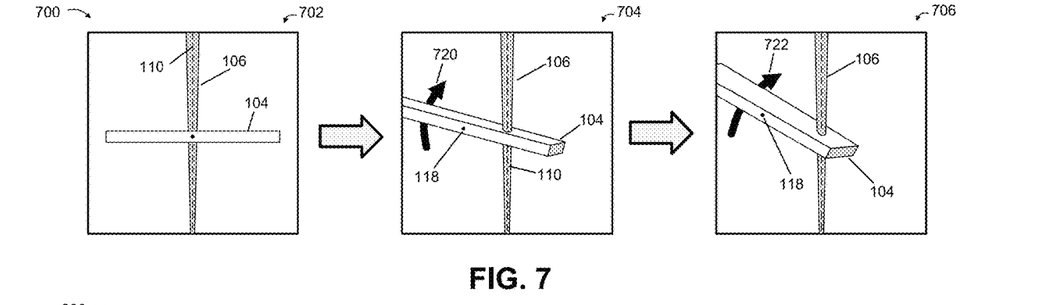
Figure 8:
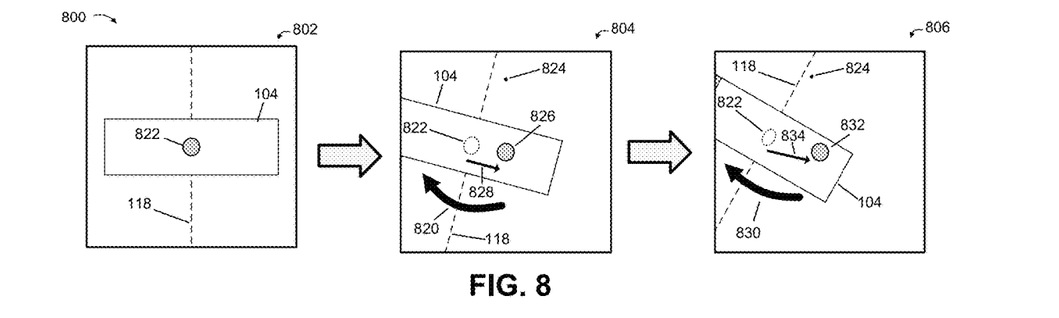

FIGS. 7 and 8 are diagrams that illustrate a side view 700 and top down view 800 of a sample process for conducting tomographic imaging microscopy of a sample with a high energy beam.

Specifically, FIG. 7 is a collection of side view images that illustrate a process for modifying the region irradiated during tomography by rotating the sample about two different axes. Image 702 shows a side view image of a sample 104 being held by a sample holder in a first rotational position. In image 702, the sample 104 is being irradiated with a charged particle beam 106 traveling along an emission axis 110. Image 704 depicts the sample 104 being held in the second rotational position from a side view. Image 704 also shows a first rotational movement 720 of sample 104 about axis 118 which changes the tilt of the sample in relation to the charged particle beam 106. Image 704 also shows the sample 104 after an additional rotational movement 820 (pictured in FIG. 8) about a different access has been applied to it. Image 706 depicts the sample 104 being held in the third rotational position from a side view. Image 706 also shows a second rotational movement 722 of sample 104 about axis 118 which changes the tilt of the sample in relation to the charged particle beam 106. Additionally, image 706 shows the sample 104 after a second additional rotational movement 830 (pictured in FIG. 8) about the different access has been applied to it.

FIG. 8 is a collection of top down images that illustrate a process for modifying the region irradiated during tomography by rotating the sample about two different axes. Image 802 shows a top down view the sample 104 being held in the first rotational position, and being irradiated with a charged particle beam 106. Image 802 further shows the first region 822 of the sample 104 that is irradiated by the charged particle beam 106 while in the first rotational position. Image 804 shows the sample 104 being held in the second rotational position. Image 804 also shows an additional rotational movement 820 of the sample 104 about the different axis 824. While FIG. 8 illustrates an embodiment where the different axis 824 is parallel to the path of charged particle beam 106, this is not required and any additional axis is possible so long as it is different from the axis 118.

Image 404 shows how the first rotational movement 720 and the additional rotational movement 820 cause the second region 826 of the sample 104 to be irradiated by the charged particle beam 106. Image 804 also shows the positional difference 828 between the first region 822 that is irradiated when the sample 104 is in the first rotational position and the second region 826 that is irradiated when the sample 104 is in the second rotational position.

Image 806 depicts the sample 104 being held in the third rotational position. Image 806 shows a second additional rotational movement 830 of the sample 104 about the axis 824. Image 806 shows how the second rotational movement 722 and the second additional rotational movement 830 cause a third region 832 of the sample 104 to be irradiated by the charged particle beam 106. Image 806 also shows the positional difference 834 between the first region 822 that is irradiated when the sample 104 is in the first rotational position and the third region 832 that is irradiated when the sample 104 is in the third rotational position. While FIGS. 7 and 8 depict the first rotational movement 720, the second rotational movement 722, the additional rotational movement 820, and the second additional rotational movement 830 as being discrete movements. However, one or more of these movements may correspond to a component portion of a continuous movement between a starting position to an ending position.

Examples of inventive subject matter according to the present disclosure are described in the following enumerated paragraphs.

A1. A method for conducting tomographic imaging electron microscopy of a sample with a high energy beam, the method comprising: irradiating, with a charged particle beam, a first region of the sample in a first angular position; detecting first emissions resultant from the charged particle beam irradiating the first region; causing the sample to be repositioned to a second angular position; irradiating, with the charged particle beam, a second region of the sample in the second angular position, wherein the rotation of the sample from the first angular position to the second angular position at least partially causes the second region to be different than the first region; detecting second emissions resultant from the charged particle beam irradiating the second region; and based at least in part on the detected first emissions and detected second emissions, generating a reconstruction of a portion of the sample.

A2. The method of paragraph A1, further comprising estimating a positional difference between the first region and the second region, and where the estimated positional difference is used to generate the 3D model of the portion of the sample.

A2.0.1 The method of paragraph A2, wherein estimating the positional difference comprises determining a geometric relationship between the first region and the second region.

A2.0.2 The method of any of paragraphs A2-A2.01, wherein the estimated positional difference is a vector difference between the first region and the second region.

A2.0.3 The method of any of paragraphs A2-A2.02, wherein estimating the positional difference comprises calculating the translation of the sample that occurred during the repositioning from the first rotational position to the second rotational position.

A2.0.4 The method of any of paragraphs A2-A2.03, wherein estimating the positional difference comprises accessing a data structure that stores correlations between a plurality of rotational positions of and corresponding geometric relationships.

A2.0.5 The method of any of paragraphs A2-A2.04, wherein estimating the positional difference comprises correlating the first image and the second image, and measuring the positional relationship between the first region and the second region based on the correlation between the first image and the second image.

A2.0.6 The method of any of paragraphs A2-A2.05, wherein estimating the positional difference is based on at least one measurement from one or more of an optical sensor, an optical microscope, a camera, sensor components of the sample holder, and a driver of the sample holder.

A2.1. The method of any of paragraphs A2-A2.0.6, wherein the charged particle beam is a TEM beam, and wherein the charged particle beam is not adjusted between the irradiation of the first region and the irradiation of the second region.

A2.2. The method of any of paragraphs A2-A2.1, wherein causing the sample to be repositioned to a second angular position comprises: causing the sample to be rotated between the first angular position and the second angular position about an axis perpendicular to the charged particle beam; and causing the sample to be translated in relation to the charged particle beam to at least partially cause the positional difference.

A2.3. The method of any of paragraphs A2-A2.2, wherein causing the sample to be repositioned to a second angular position comprises: causing the sample to be rotated between the first angular position and the second angular position about a first axis perpendicular to the charged particle beam, and causing the sample to be rotated about a second axis parallel to the charged particle beam to at least partially cause the positional difference.

A2.3.1. The method of paragraph A2.3, wherein the first axis is different from the second axis.

A2.4. The method of any of paragraphs A2-A2.3.1, wherein causing the sample to be repositioned to a second angular position comprises causing the sample to be rotated between the first angular position and the second angular position about an axis perpendicular to the charged particle beam, wherein the sample is positioned in a non-eucentric position such that the rotation of the sample about the axis causes the positional difference between the first region and the second region.

A2.4.1. The method of paragraphs A2.4, wherein the sample is positioned at least 5, 10, 25, 50, or 75 μm from a eucentric position.

A3.0. The method of any of paragraphs A1-A2.4.1, wherein generating the reconstruction of the portion of the sample comprises determining that the first image and the second image each depict a structure within the sample.

A3.0.1. The method of paragraphs A3.0, wherein the first image depicts a first portion of the structure, and the second image depicts a second portion of the structure.

A3.0.2. The method of any of paragraphs A3.0-A3.0.1, wherein the structure is one of a crystal lattice and a protein suspended in the sample.

A3.1. The method of any of paragraphs A1-A3.0.2, wherein the sample comprises a repeated structure, combining the information of in the first image with the information of the second image to generate a reconstruction of at least a portion of the repeated structure.

A3.1.1. The method of paragraph A3.0.1, wherein the first image depicts a first portion of the repeated structure, and the second image depicts a second portion of the repeated structure.

A3.1.2. The method of any of paragraphs A3.0-A3.0.1, wherein generating the reconstruction of the portion of the sample comprises generating a 3D model of the portion of the sample.

A3.2. The method of any of paragraphs A1-A3.1.2, wherein the sample comprises a crystal.

A3.2.1. The method of paragraph A3.2, wherein the detected first emissions resultant from the charged particle beam irradiating the first region and the detected second emissions resultant from the charged particle beam irradiating the second region each describe a same crystalline structure of the crystal, and wherein the generating the 3D model comprises generating a 3D model of the crystalline structure.

A3.2.2. The method of any of paragraphs A3.2-A3.2.1, wherein the sample is a lamella formed from a crystalline structure.

A4. The method of any of paragraphs A1-A3.2.2, wherein at least one of 25%, 33%, 40%, 50% and 51% of the second region of the sample is not within the first region of the sample.

A4.1. The method of paragraph A4, where the second region of the sample does not overlap with the first region of the sample.

A5. The method of any of paragraphs A1-A4.1, further comprising: causing the sample to be rotated to a third angular position; irradiating, with the charged particle beam, a third region of the sample in the third angular position, wherein the rotation of the sample from the first angular position to the second angular position at least partially causes the third region to be different than the first region and the second region; detecting third emissions resultant from the charged particle beam irradiating the third region; and wherein generating the 3D model of a portion of the sample is further based on the detected third emissions.

A5.1. The method of paragraph A5, further comprising estimating an additional positional difference between the second region and the third region, and where the additional estimated positional difference is used to generate the 3D model of the portion of the sample.

A6. The method of any of paragraphs A1-A5.1, wherein generating the 3D model of a portion of the sample comprises generating a 3D model of a protein suspended in the sample.

B1. An electron diffraction microscope system for conducting tomographic imaging electron microscopy of a sample with a high energy beam, the microscope system comprising: an charged particle beam source operable to irradiate a sample with an charged particle beam; a rotatable sample holder operable to rotate the sample about an axis perpendicular to the charged particle beam between a first angular position and a second angular position; a detection system operable to detect emissions resultant from the charged particle beam irradiating the sample; and one or more processors coupled to a memory, the memory storing non-transitory computer readable instructions that, when executed on the one or more processors, cause the electron diffraction microscope system to perform the method of any of paragraphs A1-A6.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "determine," "identify," "produce," and "provide" to describe the disclosed methods. These terms are high-level abstractions of the actual operations that are performed. The actual operations that correspond to these terms will vary depending on the particular implementation and are readily discernible by one of ordinary skill in the art.

What is claimed is:

1. A method for conducting tomographic imaging electron microscopy of a sample with a high energy beam, the method comprising:
   irradiating, with a charged particle beam, a first region of the sample in a first angular position;
   detecting first emissions resultant from the charged particle beam irradiating the first region;
   causing the sample to be repositioned to a second angular position;
   irradiating, with the charged particle beam, a second region of the sample in the second angular position, wherein the rotation of the sample from the first angular position to the second angular position at least partially causes the second region to be different than the first region;
   detecting second emissions resultant from the charged particle beam irradiating the second region;
   estimating a positional difference between the first region and the second region; and
   based at least in part on the detected first emissions, the detected second emissions, and the estimated positional difference, generating a 3D model of a portion of the sample.

2. The method of claim 1, wherein the charged particle beam is a TEM beam, and wherein the charged particle beam is not adjusted between the irradiation of the first region and the irradiation of the second region.

3. The method of claim 1, wherein causing the sample to be repositioned to a second angular position comprises:
   causing the sample to be rotated between the first angular position and the second angular position about an axis perpendicular to the charged particle beam; and
   causing the sample to be translated in relation to the charged particle beam to at least partially cause the positional difference.

4. The method of claim 1, wherein causing the sample to be repositioned to a second angular position comprises:
   causing the sample to be rotated between the first angular position and the second angular position about a first axis perpendicular to the charged particle beam, and
   causing the sample to be rotated about a second axis parallel to the charged particle beam to at least partially cause the positional difference.

5. The method of claim 1, wherein causing the sample to be repositioned to a second angular position comprises causing the sample to be rotated between the first angular position and the second angular position about an axis perpendicular to the charged particle beam, wherein the sample is positioned in a non-eucentric position such that the rotation of the sample about the axis causes the positional difference between the first region and the second region.

6. The method of claim 5, wherein the sample is positioned between 40 μm and 60 μm from a eucentric position.

7. The method of claim 1, wherein the sample comprises a crystal, and wherein the detected first emissions resultant from the charged particle beam irradiating the first region and the detected second emissions resultant from the charged particle beam irradiating the second region each describe a same crystalline structure of the crystal, and wherein the generating the 3D model comprises generating a 3D model of the crystalline structure.

8. The method of claim 1, wherein the sample is a lamella formed from a crystalline structure.

9. The method of claim 1, wherein at least 40% of the second region of the sample is not within the first region of the sample.

10. The method of claim 1, wherein the dose of the charged particle beam used to irradiate the first region and the second region is at least 0.1 e$^-$/Å$^2$/s.

11. The method of claim 1, further comprising:
causing the sample to be rotated to a third angular position;
irradiating, with the charged particle beam, a third region of the sample in the third angular position, wherein the rotation of the sample from the first angular position to the second angular position at least partially causes the third region to be different than the first region and the second region;
detecting third emissions resultant from the charged particle beam irradiating the third region; and
wherein generating the 3D model of a portion of the sample is further based on the detected third emissions.

12. The method of claim 11, further comprising estimating an additional positional difference between the second region and the third region, and where the additional estimated positional difference is used to generate the 3D model of the portion of the sample.

13. The method of claim 1, wherein generating the 3D model of a portion of the sample comprises generating a 3D model of a protein suspended in the sample.

14. An electron diffraction microscope system for conducting tomographic imaging electron microscopy of a sample with a high energy beam, the microscope system comprising:
an charged particle beam source operable to irradiate a sample with an charged particle beam;
a rotatable sample holder operable to rotate the sample about an axis perpendicular to the charged particle beam between a first angular position and a second angular position;
a detection system operable to detect emissions resultant from the charged particle beam irradiating the sample; and
one or more processors coupled to a memory, the memory storing non-transitory computer readable instructions that, when executed on the one or more processors, cause the electron diffraction microscope system to:
irradiate a first region of the sample with an charged particle beam while the sample is in a first angular position;
detect, with the detection system, first emissions resultant from the charged particle beam irradiating the first region;
cause the sample to be repositioned to the second angular position;
irradiate a second region of the sample with the charged particle beam while the sample is in the second angular position, wherein the rotation of the sample from the first angular position to the second angular position at least partially causes the second region to be different than the first region;
detect second emissions resultant from the charged particle beam irradiating the second region;
estimate a positional difference between the first region and the second region; and
based at least in part on the detected first emissions, the detected second emissions and the estimated positional difference, generating a 3D model of a portion of the sample.

15. The system of claim 14, wherein causing the sample to be repositioned to a second angular position comprises:
causing the sample to be rotated between the first angular position and the second angular position about an axis perpendicular to the charged particle beam; and
causing the sample to be translated in relation to the charged particle beam to at least partially cause the positional difference.

16. The system of claim 14, wherein causing the sample to be repositioned to a second angular position comprises:
causing the sample to be rotated between the first angular position and the second angular position about a first axis perpendicular to the charged particle beam, and
causing the sample to be rotated about a second axis that is different from the first axis to at least partially cause the positional difference.

17. The system of claim 16, where the sample is caused to be rotated about the first axis concurrently with the rotation about the second axis.

18. The system of claim 14, wherein the instructions further cause the one or more processors to:
cause the sample to be rotated to a third angular position;
irradiate third region of the sample with the charged particle beam while the sample is in the third angular position, wherein the rotation of the sample from the first angular position to the second angular position at least partially causes the third region to be different than the first region and the second region;
detect third emissions resultant from the charged particle beam irradiating the third region; and
wherein generating the 3D model of a portion of the sample is further based on the detected third emissions.

* * * * *